J. F. BOWER.
POULTRY FEEDER.
APPLICATION FILED JUNE 9, 1916.

1,216,203.

Patented Feb. 13, 1917.
2 SHEETS—SHEET 1.

Witnesses
Hugh H. Ott
Edward Yeager

Inventor
John F. Bower,
By Victor J. Evans
Attorney

J. F. BOWER.
POULTRY FEEDER.
APPLICATION FILED JUNE 9, 1916.
1,216,203.
Patented Feb. 13, 1917.
2 SHEETS—SHEET 2.
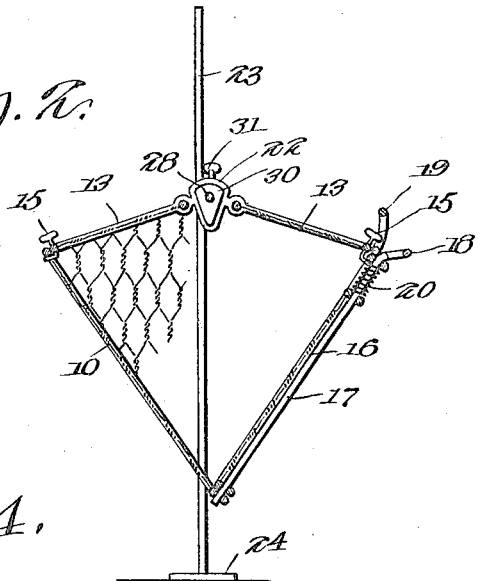
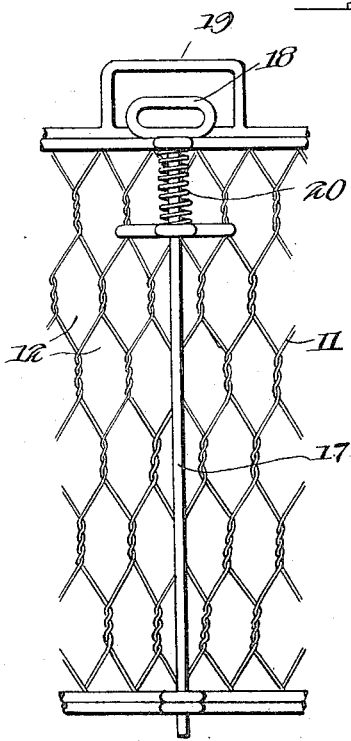
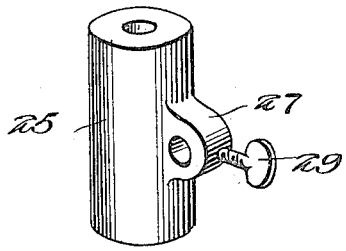
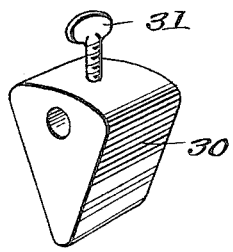
Witnesses
Hugh H. Ott
Edward Georges
Inventor
John F. Bower,
By Victor J. Evans
Attorney

UNITED STATES PATENT OFFICE.

JOHN F. BOWER, OF WILLIAMSPORT, PENNSYLVANIA.

POULTRY-FEEDER.

1,216,203. Specification of Letters Patent. Patented Feb. 13, 1917.

Application filed June 9, 1916. Serial No. 102,764.

*To all whom it may concern:*

Be it known that I, JOHN F. BOWER, a citizen of the United States, residing at Williamsport, in the county of Lycoming and State of Pennsylvania, have invented new and useful Improvements in Poultry-Feeders, of which the following is a specification.

This invention comprehends the provision of a poultry feeder embodying a feed containing receptacle, from which the poultry can pick the feed through suitable openings, the receptacle being mounted in a novel manner for vertical sliding and swinging adjustment, with means for holding it stationary when desired.

The nature and advantages of the invention will be better understood when the following description is read in connection with the accompanying drawings, the invention residing in the construction, combination and arrangement of parts as claimed.

In the drawings forming part of this specification like numerals of reference indicate similar parts in the several views and wherein:—

Figure 1 is a perspective view.

Fig. 2 is a transverse sectional view.

Fig. 3 is a view showing the manner of suspending the receptacle from an overhead support.

Fig. 4 is an enlarged detail sectional view showing the manner of locking the movable wall in closed position.

Fig. 5 is an enlarged detail view of the adjustable support.

Fig. 6 is a similar view of one of the V-shaped collars.

Referring more particularly to the drawings A indicates generally a receptacle which is preferably of triangular formation in cross section, and embodies a frame 10 to which is secured the foraminated material 11 of suitable mesh to provide substantially oblong openings 12. The receptacle is adapted to receive lawn clippings, fine cut hay, clover, cabbage, carrots, beets and other vegetables for feeding the poultry, the openings 12 being of such size to permit the head of a chicken to be inserted through openings to obtain the feed. The receptacle is closed at the top by a cover consisting of the hinged sections 13 which are mounted upon the end walls 14 and are hinged adjacent the center thereof. The sections 13 are provided with a fastening 15 adapted to engage the adjacent side wall for holding the covers locked in folded position. One of the side walls 16 is hinged along its upper edge to the frame 10 for outward swinging movement to permit a portion of the feed to be discharged from the bottom of the receptacle if desired, this side wall being preferably held in its closed position by means of a spring pressed bolt 17 slidably mounted upon said side wall and having one end passed through an opening in the lower member of the frame, and its opposite or upper end provided with a hand grip 18 projecting above the frame 10 and arranged within a handle 19 secured thereto. A spring 20 encircles the rod and exerts pressure to normally maintain the rod projected within the opening in the lower member of the frame whereby the side wall 16 is normally held in closed position. The receptacle if desired can be arranged upon a fixed support in poultry houses, coops or the like, or it can be suspended from an overhead support as shown in Fig. 2, by means of flexible elements 21 which have their ends secured to loops 22 rising from the end walls 14. If desired the end walls can be detachably associated with the receptacle to permit the latter to be knocked down. A removable partition 20' may be used to divide the receptacle into compartments.

When the receptacle contains loose and tender feed such as lawn clippings, fine cut hay or the like it is desirable to have the receptacle supported for swinging movement so that the fowls will not take from the receptacle too much feed at one time, and with this object in view I preferably support the hopper in the manner illustrated in Fig. 1. In this connection 23 indicates a pair of spaced standards rising from a base 24 which can be secured to the ground or surface in any suitable manner, and slidably mounted upon the standards 23 are the sleeves 25 which carry the set screws 26 which when moved into engagement with the standards 23 hold the sleeves fixed relatively thereto. Projecting from each sleeve at right angles thereto is an apertured lug 27 which lugs receive the opposite extremities of a transverse rod 28, which is held in position by means of the set screws 29 carried by the lugs. Loosely fitted upon the rod 28 are collars 30 of a cross sectional configuration similar to that of the loops 22 which are adapted to receive the collars 30. By reason of this construction and arrangement it is manifest that the receptacle is supported for swinging movement, and can also be adjusted vertically upon the standards to position the receptacle in proper spaced relation from the ground or surface by simply loosening the set screws 26 and adjusting the sleeves 25. Of course when the set screws 26 are tightened against the standards 23 the receptacle is held in its adjusted position. It is sometimes necessary to loosen the feed contained within the receptacle, and this can be easily accomplished by simply swinging the receptacle, or turning the latter completely over upon the rod 27. When the receptacle contains feed that is hard to pick or remove therefrom, such as beets, carrots, turnips or the like it is desirable to have the receptacle stationary, which is accomplished by adjusting the set screws 31 carried by the collars 30, and when the set screws are brought into engagement with the rod 27 the receptacle is held immovably positioned thereon. This construction and arrangement permits the receptacle to be supported in an inverted position out of the way when its use is not desired, or while the chicken house, coop or the like is being cleaned.

While it is believed that from the foregoing description the nature and advantages of the invention will be readily apparent, I desire to have it understood that what is herein shown and described is merely illustrative of the preferred embodiment of the invention to which I do not limit myself and that such changes in the construction and arrangement of parts may be resorted to when desired as fall within the scope of what is claimed.

What is claimed is:—

1. A poultry feeder comprising a receptacle including a frame, and foraminated side and end walls providing substantially oblong pick openings, a closure for the receptacle, and loops rising from the end walls thereof for the purpose described.

2. A poultry feeder comprising a substantially triangular-shaped receptacle including a frame, and foraminated side and end walls providing enlarged pick openings, a closure for the receptacle, one of said side walls being hinged at its upper edge to said frame, and means for locking said side wall in closed position.

3. In a poultry feeder, a pair of spaced standards, a transverse rod connecting the standards and movable longitudinally thereof, means for holding the rod in adjusted position, a receptacle swingingly mounted upon the rod and having enlarged pick openings, a closure for the receptacle, and means for holding the latter fixed relatively to the rod.

4. In a poultry feeder, a pair of spaced standards, sleeves slidably mounted on the standards, means for holding the sleeves fixed in adjusted position, apertured lugs projecting from the sleeves, a transverse rod supported by the lugs and connecting said standards, a receptacle swingingly mounted upon the rod and having enlarged pick openings, a closure for the receptacle, and means for holding the latter fixed relatively to said rod.

In testimony whereof I affix my signature.

JOHN F. BOWER.

Copies of this patent may be obtained for five cents each, by addressing the "Commissioner of Patents, Washington, D. C."